(12) United States Patent
Amano

(10) Patent No.: US 8,302,177 B2
(45) Date of Patent: Oct. 30, 2012

(54) IMAGE PROCESSING APPARATUS, IMAGE PROCESSING CONTROL METHOD AND COMPUTER READABLE MEDIUM

(75) Inventor: Yasushi Amano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 419 days.

(21) Appl. No.: 12/553,449

(22) Filed: Sep. 3, 2009

(65) Prior Publication Data
US 2010/0251356 A1 Sep. 30, 2010

(30) Foreign Application Priority Data
Mar. 24, 2009 (JP) .................................. 2009-071736

(51) Int. Cl.
G06F 21/00 (2006.01)
(52) U.S. Cl. .......................................... 726/9; 713/185
(58) Field of Classification Search .................. 713/168, 713/172, 185, 183, 186, 170, 182; 726/2, 726/4, 17, 27, 28, 29, 30
See application file for complete search history.

(56) References Cited

U.S. PATENT DOCUMENTS
2007/0234429 A1* 10/2007 Mizutani .................... 726/26
2010/0115593 A1 5/2010 Uchida et al.
2010/0325722 A1 12/2010 Uchida FOREIGN PATENT DOCUMENTS
| JP | A-2005-084991 | 3/2005 |
|---|---|---|
| JP | A-2006-338510 | 12/2006 |
| JP | A-2008-146449 | 6/2008 |
| JP | A-2008-152604 | 7/2008 |
| WO | WO 2008/105231 A1 | 9/2008 |
| WO | WO 2008/126507 A1 | 10/2008 |

OTHER PUBLICATIONS

Office Action issued in Japanese Patent Application No. 2009-071736 dated Mar. 15, 2011 (with Translation).
Japanese Office Action issued in Application No. 2009-071736; Dated Jan. 11, 2011 (With Translation).

* cited by examiner

Primary Examiner — Gilberto Barron, Jr.
Assistant Examiner — Izunna Okeke
(74) Attorney, Agent, or Firm — Oliff & Berridge, PLC

(57) ABSTRACT

An image processing apparatus includes: an image processing unit; a processing unit that performs predetermined processing under the control of the information processing unit; a reading unit that performs an operation of reading authentication information at intervals of a predetermined time under the control of the information processing unit; an authentication unit that authenticates a user based on the authentication information read by the reading unit under the control of the information processing unit; a permission unit that permits the predetermined processing to be performed by the processing unit on the condition that the authentication is completed by the authentication unit; and a change unit that changes the time interval for the reading unit to perform the reading operation in accordance with the status of processing to be executed.

5 Claims, 6 Drawing Sheets

IMAGE PROCESSING APPARATUS, IMAGE PROCESSING CONTROL METHOD AND COMPUTER READABLE MEDIUM

CROSS-REFERENCE TO RELATED APPLICATIONS

This application is based on and claims priority under 35 USC 119 from Japanese Patent Application No. 2009-071736 filed on Mar. 24, 2009.

BACKGROUND

Technical Field

The present invention relates to an image processing apparatus and an image processing control method and a computer readable medium.

SUMMARY

According to an aspect of the invention, an image processing apparatus includes: an image processing unit; a processing unit that performs predetermined processing under the control of the information processing unit; a reading unit that performs an operation of reading authentication information at intervals of a predetermined time under the control of the information processing unit; an authentication unit that authenticates a user based on the authentication information read by the reading unit under the control of the information processing unit; a permission unit that permits the predetermined processing to be performed by the processing unit on the condition that the authentication is completed by the authentication unit; and a change unit that changes the time interval for the reading unit to perform the reading operation in accordance with the status of processing to be executed.

BRIEF DESCRIPTION OF THE DRAWINGS

Exemplary embodiment(s) of the present invention will be described in detail based on the following figures, wherein.

DETAILED DESCRIPTION

Exemplary embodiments of the invention will be described below.

A first exemplary embodiment of the invention will be described first.

Figure 1:
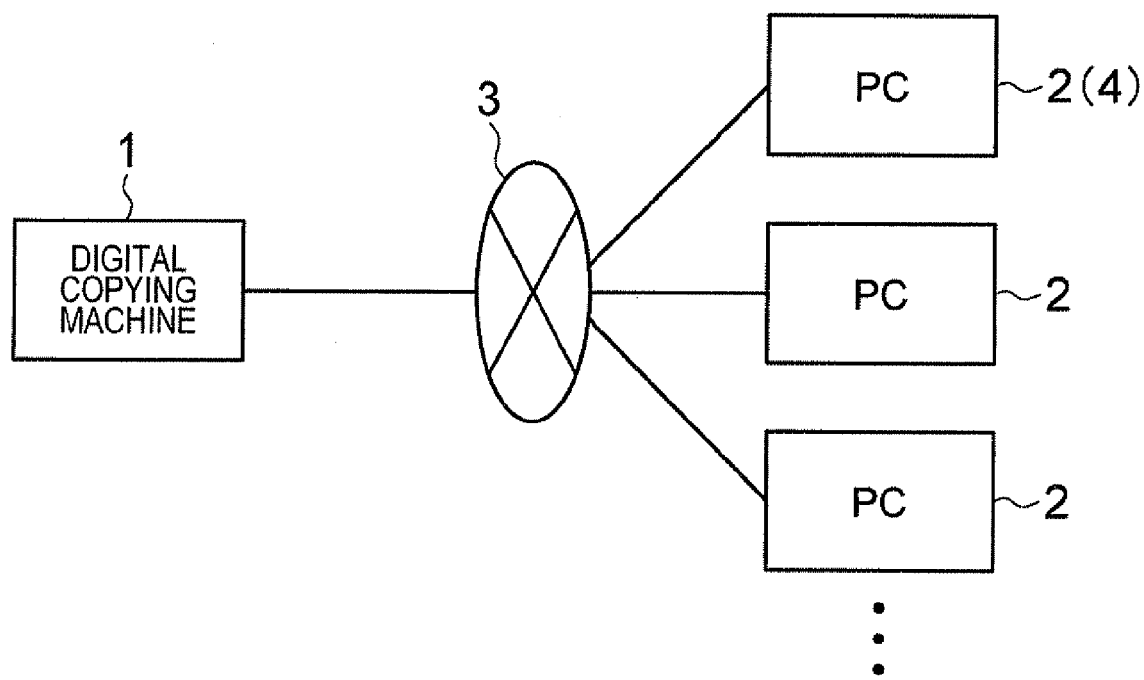
FIG. 1 is a block diagram for explaining the overall configuration of a system according to a first exemplary embodiment of the invention.

FIG. 1 is a block diagram for explaining the overall configuration of a system according to the first exemplary embodiment.

In this system, a digital copying machine 1 placed in an office or the like for performing an image processing apparatus according to the invention is connected to respective user's personal computers (PCs) 2 for the digital copying machine 1 via a network 3 such as an LAN. One of the PCs 2 is an administrative PC 4 used by an administrator of the digital copying machine 1.

Figure 2:
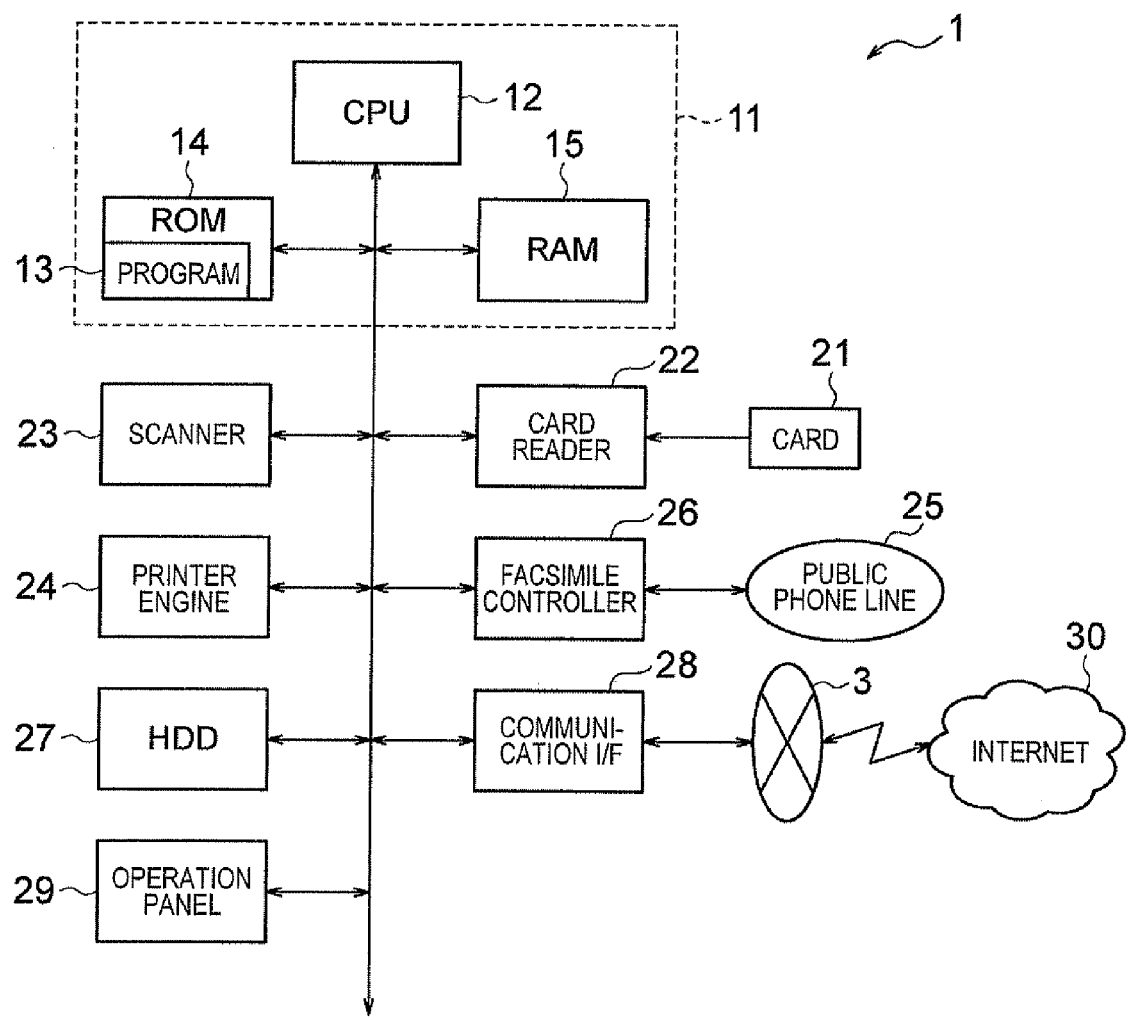
FIG. 2 is an electric connection block diagram of a digital copying machine according to the first exemplary embodiment of the invention.

FIG. 2 is an electric connection block diagram of the digital copying machine 1.

The digital copying machine 1 has a control portion 11 which controls the whole of the digital copying machine 1. The control portion 11 has a CPU 12 which controls respective parts in a centralized manner, an ROM 14 which is connected to the CPU 12 and in which various types of control programs 13 to be executed by the CPU 12 and stationary data are stored, and an RAM 15 which is connected to the CPU 12 and which serves as a working area of the CPU 12.

The control programs 13 may be set up initially in production of the digital copying machine 1. Alternatively, the control programs 13 may be stored in a recording medium so that the control programs 13 can be read from the recording medium and set up on a nonvolatile memory, a magnetic recording device or the like later. Alternatively, the control programs 13 may be downloaded in the form of carrier waves through a communication unit such as the Internet and set up on nonvolatile memory, a magnetic recording device or the like later.

A card reader 22, a scanner 23, a printer engine 24, a facsimile controller 26, a magnetic recording device (HDD) 27, a communication interface (I/F) 28 and an operation panel 29 are connected to the control portion 11. The card reader 22 reads a card 21. The scanner 23 reads an image of an original. The printer engine 24 forms an image on a medium such as a sheet of paper by electrophotography or another method. The facsimile controller 26 is connected to a public phone line 25 or the like and performs facsimile transmission and reception. The magnetic recording device (HDD) 27 stores image data, etc. The communication I/F 28 communicates with the outside via a network 3. The operation panel 29 accepts various kinds of operations. The communication I/F 28 may be connected to the Internet 30 via the network 3.

For example, the card 21 is an IC card on which a password or personal identification number is recorded for authenticating a user who possesses the card 21. The password or personal identification number is read by the card reader 22 to authenticate the user about a license to use the digital copying machine 1. The means for authenticating the user is not limited thereto. For example, a password or personal identification number may be input through the operation panel 29 or biometrics authentication such as fingerprint authentication may be used. When biometrics authentication is used, a reader for reading biometric information such as fingerprint information is used in place of the card reader 22 so that the reader is connected to the digital copying machine 1.

Processing executed by the control portion 11 based on the control programs 13 will be described next.

Figure 3:
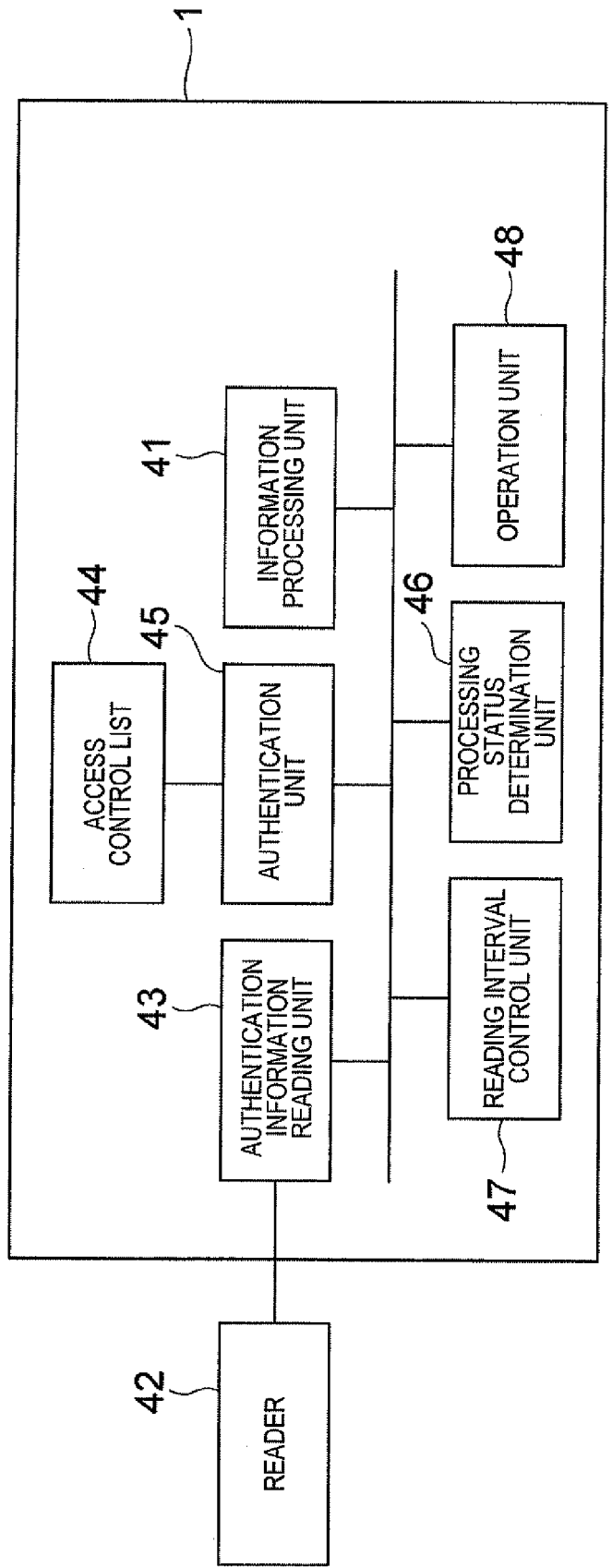
FIG. 3 is a functional block diagram of the digital copying machine according to the first exemplary embodiment of the invention.

FIG. 3 is a functional block diagram of processing executed by the control portion 11 based on the control programs 13.

An information processing unit 41 controls respective units shown in FIG. 3 in a centralized manner. The information processing unit 41 is implemented by the control portion 11. A reader 42 is implemented by the card reader 22 or a reader for reading biometric information such as fingerprint information. An authentication information reading unit 43 uses the reader 42 for reading a password or personal identification number or authentication information such as biometric information.

An access control list 44 is stored in a storage device such as an HDD 27. Passwords, personal identification numbers, biometric information, etc. are registered in the access control list 44 so that authentication information read by the authentication information reading unit 43 can be collated when user authentication is performed. An authentication unit 45 collates the authentication information read by the authentication information reading unit 43 with information registered in the access control list 44 to thereby authenticate the user about a license to use the digital copying machine 1.

A processing status determination unit 46 determines the processing status operated in the digital copying machine 1. A reading interval control unit 47 changes a time interval for the reader 42 to read authentication information in accordance with the processing status determined by the processing status determination unit 46. That is, the reader 42 performs an authentication information reading operation at intervals of a predetermined time. This time interval can be changed. An operation unit 48 accepts various kinds of operations from the user through the operation panel 29.

Figure 4:
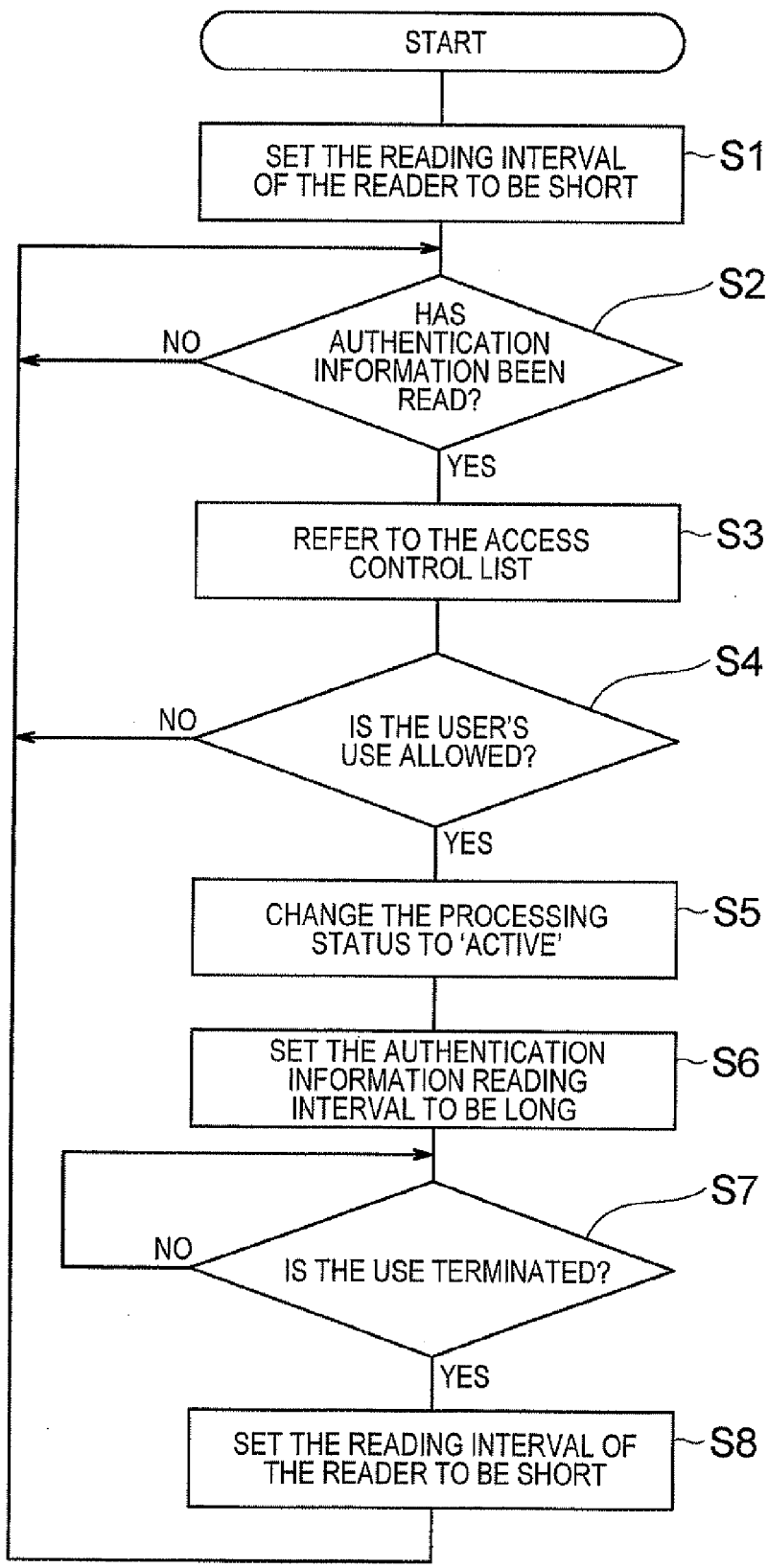
FIG. 4 is a flow chart of the digital copying machine according to the first exemplary embodiment of the invention.

FIG. 4 is a flow chart of processing executed by the control portion 11 based on the control programs 13.

Processing in FIG. 4 starts when a main power supply of the digital copying machine 1 is turned on. First, the time interval for the reader 42 to read authentication information is set to be short by the authentication information reading unit 43 (step S1).

That is, the time interval for the reader 42 to read authentication information is set to be a short time interval predetermined as a default value. Accordingly, the reader 42 can read authentication information rapidly compared with the case where setting in step S6 which will be described later has been performed.

Then, when the user makes the reader 42 read the card 21 or biometric information such as fingerprint information so that authentication information is read (Y in step S2), the authentication unit 45 refers to the access control list 44 (step S3) and determines whether the user is allowed to use the digital copying machine 1 or not (step S4). When the authentication unit 45 determines that the user is allowed to use the digital copying machine 1 (Y in step S4), the user is permitted to use (log in) the digital copying machine 1 because the user has been authenticated about a license to use the digital copying machine 1. As a result, the user can operate the operation unit 48 freely to perform various kinds of processing allowed to be executed by the digital copying machine 1, that is, to perform copying, printing, scanning, facsimile processing, etc. On this occasion, the processing status of the digital copying machine 1 is changed to 'active' (step S5).

In response to the processing status of the digital copying machine 1 changed to 'active', a reading interval control unit 47 sets the reading interval for the reader 42 to read authentication information to be longer than that in the step S1 through the authentication information reading unit 43 (step S6).

Accordingly, because the information processing unit 41 need not devote a large throughput capacity to controlling the authentication information reading unit 43, the information processing unit 41 can devote a relatively large throughput capacity to controlling a job of the digital copying machine 1 operated by the user compared with the situation where processing in the step S6 has not been performed yet.

When the card 21 for authentication is removed from the reader 42 or a predetermined operation is accepted by the operation unit 48, the user's use of the digital copying machine 1 is terminated (logged out) (Y in step S7). Then, the time interval for the reader 42 to read authentication information is set to be shorter again than that in the step S6 by the authentication information reading unit 43 (step S8) and the situation of processing goes back to the step S2.

Accordingly, after the user's use of the digital copying machine 1 is terminated, the reader 42 can read authentication information rapidly compared with the case where setting in the step S6 has been performed.

A second exemplary embodiment of the invention will be described next.

The hardware configuration of a digital copying machine 1 according to this exemplary embodiment is the same as that of the digital copying machine 1 according to the first exemplary embodiment as described above with reference to FIGS. 1 and 2. The functional block diagram of the digital copying machine 1 according to this exemplary embodiment is the same as that of the digital copying machine 1 according to the first exemplary embodiment as described above with reference to FIG. 3. The same numerals in FIGS. 1 to 3 are used in the following description for the sake of omission of detailed description. In this exemplary embodiment, processing in FIG. 5 is performed in place of processing in FIG. 4.

Figure 5:
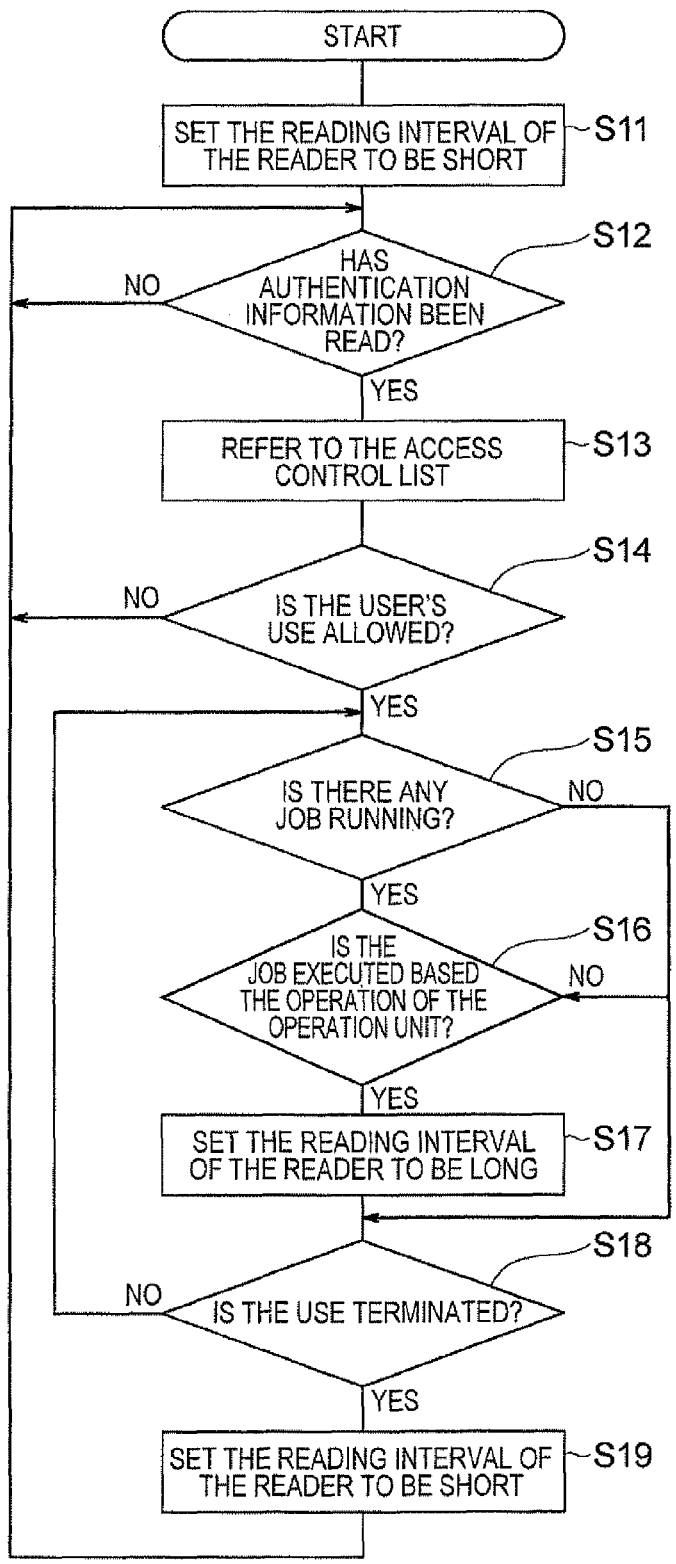
FIG. 5 is a flow chart of a digital copying machine according to a second exemplary embodiment of the invention.

Processing in FIG. 5 starts when the main power supply of the digital copying machine 1 is turned on. First, the authentication information reading unit 43 sets the time interval for the reader 42 to read authentication information to be shorter than that in step S17 which will be described later (step S11).

That is, the time interval for the reader 42 to read authentication information is set to be a short time interval predetermined as a default value. Accordingly, the reader 42 can read authentication information rapidly compared with the case where setting in step S17 which will be described later has been performed.

Then, when the user makes the reader 42 read the card 21 or biometric information such as fingerprint information so that authentication information is read (Y in step S12), the authentication unit 45 refers to the access control list 44 (step S13) and determines whether the user is allowed to use the digital copying machine 1 or not (step S14). When the authentication unit 45 determines that the user is allowed to use the digital copying machine 1 (Y in step S14), the user is permitted to use (log in) the digital copying machine 1 because the user has been authenticated about a license to use the digital copying machine 1. As a result, the user can operate the operation unit 48 freely to perform various kinds of processing allowed to be executed by the digital copying machine 1, that is, to perform copying, printing, scanning, facsimile processing, etc.

When there is any job running in the digital copying machine 1 (Y in step S15), determination is made as to whether the job is a job (such as copying, printing, scanning, facsimile transmission, etc.) executed based on the user's operation of the operation unit 38 (or PC 2) or whether the job is a job (such as facsimile reception, etc.) executed based on the determination of the information processing unit 41 without the user's operation of the operation unit 48 (step S16). When the job is a job executed based on the user's operation of the operation unit 48 (Y in step S16), the authentication information reading unit 43 sets the time interval of a reading operation for the reader 42 to read authentication information to be longer than that in the step S11 (step S17).

As a result, because the information processing unit 41 need not devote a large throughput capacity to controlling the authentication information reading unit 43 when a job executed based on the user's operation of the operation unit 48 is performed, the information processing unit 41 can devote a relatively large throughput capacity to controlling the processing of the digital copying machine 1 operated by the user. Accordingly, the job executed based on the user's operation of the operation unit 48 can be performed rapidly compared with the job executed based on the determination of the information processing unit 41 without the user's operation of the operation unit 48.

On the other hand, when a job executed based on the determination of the information processing unit 41 without the user's operation of the operation unit 48 is performed (N in step S16), the reader 42 can read authentication information rapidly compared with the case where a job executed based on the user's operation of the operation unit 48 is performed.

When the card 21 for authentication is removed from the reader 42 or a predetermined operation is accepted by the operation unit 48, the user's use of the digital copying machine 1 is terminated (logged out) (Y in step S18). Then, the time interval for the reader 42 to read authentication information is set to be shorter again than that in the step S17 by the authentication information reading unit 43 (step S19). In this case, the situation of processing goes back to the step S12.

Accordingly, after the user's use of the digital copying machine 1 is terminated, the reader 42 can read authentication information rapidly compared with the case where a job executed based on the user's operation of the operation unit 48 is performed.

When the user's use of the digital copying machine 1 is not terminated (logged out) (N in step S18), the situation of processing goes back to the step S15.

A third exemplary embodiment of the invention will be described next.

The hardware configuration of a digital copying machine 1 according to this exemplary embodiment is the same as that of the digital copying machine 1 according to the first exemplary embodiment as described above with reference to FIGS. 1 and 2. The functional block diagram of the digital copying machine 1 according to this exemplary embodiment is the same as that of the digital copying machine 1 according to the first exemplary embodiment as described above with reference to FIG. 3. The same numerals in FIGS. 1 to 3 are used in the following description for the sake of omission of detailed description. In this exemplary embodiment, processing in FIG. 6 is performed in place of processing in FIG. 4.

Figure 6:
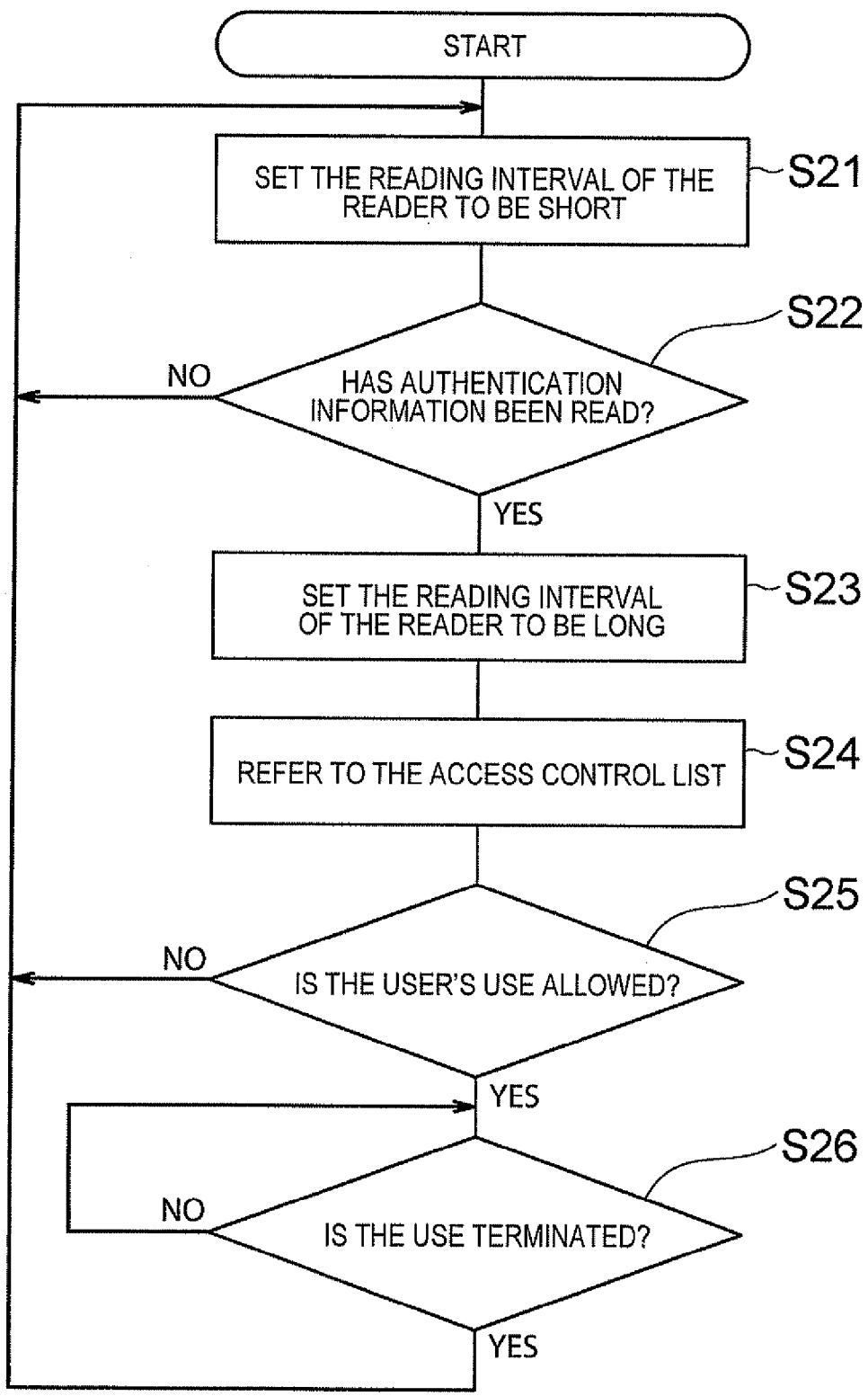
FIG. 6 is a flow chart of a digital copying machine according to a third exemplary embodiment of the invention.

Processing in FIG. 6 starts when the main power supply of the digital copying machine 1 is turned on. First, the authentication information reading unit 43 sets the time interval for the reader 42 to read authentication information to be shorter than that in step S23 which will be described later (step S21).

That is, the time interval for the reader 42 to read authentication information is set to be a short time interval predetermined as a default value. Accordingly, the reader 42 can read authentication information rapidly compared with the case where setting in step S23 which will be described later has been performed.

Then, when the user makes the reader 42 read the card 21 or biometric information such as fingerprint information so that authentication information is read (Y in step S22), the authentication information reading unit 43 sets the time interval of a reading operation for the reader 42 to read authentication information to be longer than that in the step S21 (step S23). Then, the authentication unit 45 refers to the access control list 44 (step S24) and determines whether the user is allowed to use the digital copying machine 1 or not (step S25). When the authentication unit 45 determines that the user is allowed to use the digital copying machine 1 (Y in step S25), the user is permitted to use (log in) the digital copying machine 1 because the user has been authenticated about a license to use the digital copying machine 1. As a result, the user can operate the operation unit 48 freely to perform various kinds of processing allowed to be executed by the digital copying machine 1, that is, to perform copying, printing, scanning, facsimile processing, etc.

As described above, when authentication information is read (Y in step S22), the authentication information reading unit 43 sets the time interval of a reading operation for the reader 42 to read authentication information to be longer than that in the step S21 (step S23). As a result, because the information processing unit 41 need not devote a large throughput capacity to controlling the authentication information reading unit 43, the information processing unit 41 can devote a relatively large throughput capacity to controlling processing of jobs such as copying, printing, scanning, facsimile processing, etc. Accordingly, these jobs can be executed rapidly.

Moreover, because processing in steps S24 and S25 is performed after the authentication information reading unit 43 sets the time interval of a reading operation for the reader 42 to read authentication information to be longer than that in the step S21, the user authentication process can be performed rapidly compared with the case according to the first or second exemplary embodiment.

When the card 21 for authentication is removed from the reader 42 or a predetermined operation is accepted by the operation unit 48 so that the user's use of the digital copying machine 1 is terminated (logged out) (Y in step S26), the situation of processing goes back to the step S21 in which the time interval for the reader 42 to read authentication information is set to be shorter again than that in the step S23 by the authentication information reading unit 43.

Accordingly, after the user's use of the digital copying machine 1 is terminated, the reader 42 can read authentication information rapidly compared with the case where setting in the step S23 has been performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image processing apparatus comprising:
an image processing unit;
a processing unit that performs predetermined processing under the control of the information processing unit;
a reading unit that performs an operation of reading authentication information at intervals of a predetermined time under the control of the information processing unit, the reading unit being a card reader or a biometric information reader;
an authentication unit that authenticates a user based on the authentication information read by the reading unit under the control of the information processing unit;

a permission unit that permits the predetermined processing to be performed by the processing unit on the condition that the authentication is completed by the authentication unit; and a change unit that changes the time interval for the reading unit to perform the reading operation in accordance with the status of processing to be executed, wherein the image processing unit, the processing unit, the authentication unit, the permission unit and the change unit are accomplished by one or more processors, the change unit changes the time interval to a longer interval when the permission unit permits the predetermined processing to be performed by the processing unit as compared to when the permission unit does not permit the predetermined processing, the image processing apparatus sets the status of processing to an active status when the permission unit permits the predetermined processing, and the time interval to perform the reading operation is set to be shorter at a time when reading begins than when the processing status is set to the active status.

2. The image processing apparatus according to claim 1, further comprising:

an acceptance unit that accepts various kinds of operations, wherein the change unit changes the time interval to a long interval when the processing caused by the operation accepted by the acceptance unit is performed by the processing unit compared with the case where the processing not caused by the operation is performed by the processing unit, and the acceptance unit is accomplished by the one or more processors.

3. The image processing apparatus according to claim 1, wherein the change unit changes the time interval to a long interval until the processing performed by the processing unit is completed or the authentication unit cannot authenticate the user based on the authentication information after the reading unit reads the authentication information compared with the other case.

4. An image processing control method comprising:

performing predetermined processing under the control of an information processing unit;

performing an operation of reading authentication information at intervals of a predetermined time under the control of the information processing unit, such that the intervals are shorter when the reading begins than when a processing status is set to an active status;

authenticating a user based on the authentication information read under the control of the information processing unit;

permitting the predetermined processing to be performed on the condition that the authenticating is completed;

setting the status of processing to the active status when the predetermined processing is permitted; and changing the time interval to perform the reading operation in accordance with the status of processing to be executed, including changing the time interval to a longer interval when the predetermined processing is permitted to be performed by the processing unit as compared to when the predetermined processing is not permitted.

5. A non-transitory computer readable medium storing a program causing a computer to execute a process for image processing control, the process comprising:

performing predetermined processing under the control of an information processing unit;

performing an operation of reading authentication information at intervals of a predetermined time under the control of the information processing unit, such that the intervals are shorter when the reading begins than when a processing status is set to an active status;

authenticating a user based on the authentication information read under the control of the information processing unit;

permitting the predetermined processing to be performed on the condition that the authenticating is completed;

setting the status of processing to the active status when the predetermined processing is permitted; and changing the time interval to perform the reading operation in accordance with the status of processing to be executed, including changing the time interval to a longer interval when predetermined processing is permitted to be performed by the processing unit as compared to when the predetermined processing is not permitted.

* * * * *